3,163,552
PROCESS FOR MAKING FIBROUS MATERIAL HYDROPHOBIC
Herbert Frotscher, Dusseldorf-Benrath, Germany, assignor to Bohme Fettchemie G.m.b.H., Dusseldorf, Germany, a corporation of Germany
No Drawing. Filed Feb. 20, 1961, Ser. No. 90,239
Claims priority, application Germany, Feb. 27, 1960, B 56,852
15 Claims. (Cl. 106—287)

This invention relates to a method and composition for waterproofing fibrous materials in various forms. It more particularly relates to the use of a solution of a reaction product of polyamines having lipophilic radicals and epichlorohydrin for waterproofing fibrous materials.

I have found that reaction products of polyamines containing lipophilic radicals, which contain more than two reactive hydrogen atoms attached to a nitrogen atom, and epichlorohydrin are highly suitable for making materials hydrophobic, including such materials as fibers, flakes, threads, ribbons, fabrics, knitted goods and felts made of any desired fibrous material as well as paper, cardboard and fiberboard made of cellulose fibers, and leather and leather substitutes made of collagen fibers.

The polyamines containing lipophilic radicals which are used in the process according to the invention may, for example, be obtained by amidation of high molecular fatty acids or fatty acid esters with polyamines or by reaction of polyamines with those derivatives of fatty alcohols, fatty amines, etc., which react with amino-hydrogens. Examples of such derivatives of fatty alcohols, fatty amines and the like are the following:

Alkylhalides,
Alkyl-sulfuric acid esters,
Alkyl-arylsulfonic acid esters,
Alkylchlorohydrin ethers,
Alkyl-glycidyl ethers.

For reaction with these products, acylic or cyclic polyamines may be used, such as:

Ethylenediamine,
Diethylenetriamine,
Dipropylenetriamine,
Triethylenetetramine,
Tetraethylenepentamine,
Phenylenediamine,
as well as alkylene- or arylenepolyamines.

In addition, the polyamines containing lipophilic radicals which are employed in the process may be polyamines which contain more than two reactive hydrogen atoms attached to a nitrogen atom in the molecule, N-alkyl-alkylenediamines, such as those which are obtained by reaction of high molecular alkylamines with acrylonitriles and subsequent hydrogenation or by reaction of high molecular alkylamines with alkyleneimines, for example. The lipophilic radicals may be of an aliphatic, aliphatic-cycloaliphatic or fatty aromatic nature. The polyamines containing the lipophilic radicals may comprise one or more lipophilic radicals in the molecule. The sum of the carbon atoms of the lipophilic radicals should be at least 12, preferably 16 to 40.

The reaction of these substituted polyamines with epichlorohydrin is also effected according to known methods, if required in the presence of solvents, such as low molecular alcohols and/or water, as well as in the presence of acid-binding agents, such as alkalis, if necessary. The reaction products thus obtained are pasty substances which are soluble or readily dispersible in water.

The treatment of the material to be made hydrophobic wtih the reaction products according to the invention may be effected by means of an immersion process as well as by means of a surface coating process.

In the immersion process the goods to be treated are, for example, impregnated in a padding machine at room temperature or at slightly elevated temperature with an aqueous solution which contains not only from 1 to 80 gm. per liter, preferably 5 to 40 gm. per liter, of one of the above-mentioned reaction products, but also a small amount of a bicarbonate, preferably sodium bicarbonate, or another alkaline reacting agent. The indicated weight quantities are based upon the active substance. After squeeze-drying, the treated material is dried at elevated temperatures, for example, between 80 and 120° C.

In the surface coating process, the material to be treated is treated at any desired solution ratio with a dilute aqueous solution which contains from 0.1 to 10%, preferably from 0.5 to 5%, based upon the weight of the material to be treated, of one of the above-mentioned reaction products, the solution being adjusted to a pH value of about 6.5 to 7 with a bicarbonate. The treatment is begun at about 40° C. The temperature of the bath is increased during the treatment to about 90 to 95° C., whereby the waterproofing agent is applied to the surface of the fibrous material. The waterproofed material may be rinsed with cold water. Centrifuging and drying are effected in the usual manner. The waterproofing baths may, in addition to the above-mentioned reaction products, contain known finishing agents, such as starch, cellulose derivatives, etc., and waterproofing agents, such as paraffin-containing products of various types.

The following specific examples are given to further illustrate my invention and to enable persons skilled in the art to better understand and practice my invention, and are not intended to be limitative.

*Example I*

A cotton poplin fabric was immersed into a bath which contains 20 gm. per liter of the reaction product described below and 2 gm. per liter of sodium bicarbonate. The impregnated fabric was squeeze-dried to a solution absorption of 60 to 70% and was then dried at about 100° C.

The water pressure test according to Schopper on the treated material resulted in a water column of 380 mm. The same fabric, after ten washings by boiling for ½ hour in a washing solution containing 2 gm. per liter of soap and 2 gm. per liter of soda, supported a water column of 325 mm.

The reaction product above referred to was produced as follows:

400 parts by weight of a polyamine, which had been obtained by reaction of about 1 mol of the methyl ester of hardened cotton oil fatty acid and 1 mol of dipropylenetriamine, were melted in a heatable reaction vessel provided with a reflux cooler, a thermometer and a stirring device. At about 85° C. a mixture of about 120 parts by weight of epichlorohydrin and 100 parts by weight of denatured ethanol was added dropwise over a period of 25 minutes, while intermittently cooling the mixture. After all of the epichlorohydrin had been added, the mixture was stirred for 50 more minutes at 80 to 90° C. and was then diluted with warm water to 1200 parts by weight.

*Example II*

A cotton fabric was treated at a solution ratio of 1:50 with a solution which contained 2% of the reaction product described in Example I and 0.4% of sodium bicarbonate, based upon the weight of the air-dry fabric. The starting temperature of the treatment was 40° C. and was increased to 95° C. The treatment was continued thereafter for 20 minutes at this temperature.

Subsequently, the treated fabric was rinsed in cold water, centrifuged and dried.

The treated material exhibited a very good water-repellent effect. Even after soaking in a tub for 24 hours no wetting of the surface of the fabric occurred.

*Example III*

A poplin fabric was treated in a padding machine with a solution which contained 2 gm. per liter of sodium bicarbonate and 35 gm. per liter of the reaction product described below, the treated fabric was squeeze-dried to a solution absorption of about 70% and was then dried at a temperature of about 100° C.

The water pressure test according to Schopper on the treated fabric resulted in a water column of 372 mm. After ten launderings by boiling for ½ hour with a solution of soap and soda, the same fabric supported a water column of 320 mm.

The reaction product referred to above was obtained as follows:

130 parts by weight of a technical saturated fatty alcohol with an average molecular weight of about 260, which was obtained by hydrogenation of tallow fatty acid, were melted in a heatable reaction vessel provided with a thermometer, a reflux cooler and a stirring device. Thereafter, 1 part by weight of tin tetrachloride and 46.5 parts by weight of epichlorohydrin were added in that order at 70° C. in such a manner that the temperature was maintained at about 70° C. Thereafter, the mixture was stirred for 30 minutes at 70° C. To the technical chlorohydrin ether, 33 parts by weight of dipropylenetriamine and 44 parts by weight of 50% sodium hydroxide were then added and, while increasing the temperature to about 120° C., the mixture was stirred for 45 minutes more. The polyamine thus obtained was freed from sodium chloride and residual alkali by washing twice with 250 parts by weight of hot water. The washing solutions were removed by vacuum filtration. The polyamine thus obtained was admixed with about 100 parts of denatured technical ethanol and was then reacted with 37.5 parts of epichlorohydrin at about 80° C. until after about 80 minutes the pH value of a sample dissolved in water had dropped to about 5. The reaction mixture was then diluted with warm water to about 1000 parts by weight and was stirred cold.

*Example IV*

A rayon fabric was treated in a padding machine with a solution which contains 30 gm. per liter of the reaction product described below and 2 gm. per liter of sodium bicarbonate. The treated fabric was squeeze-dried to about 90% solution absorption and was dried at about 120° C. The treated rayon fabric exhibited a good water-repellent effect, which was retained even after ten launderings by boiling with a solution of soap and soda.

The reaction product referred to above was obtained as follows:

130.5 parts by weight of technical hexadecylchloride were admixed by stirring with 66 parts by weight of dipropylenetriamine, 51 parts by weight of 50% sodium hydroxide solution and 60 parts by weight of 96% denatured alcohol in a reaction vessel provided with a reflux cooler, a thermometer and a stirring device. The resulting mixture was refluxed for 15 hours. Thereafter, the precipitated sodium chloride was filtered off. The filtrate was reacted at about 80° C. with 93 parts by weight of epichlorohydrin for 60 minutes, and then the reaction mixture was diluted with hot water to 1000 parts by weight.

*Example V*

A cotton poplin fabric was treated in the same manner as described in Example I with the reaction product described below. The treated fabric, subjected to the water pressure test according to Schopper, supported a water column of 350 mm. After ten launderings of ½ hour each with a solution containing 2 gm. per liter of soap and 2 gm. per liter of soda, the treated fabric supported a water column of 310 mm.

The reaction product referred to above was prepared as follows:

300 parts by weight of N-hexadecyl-propylenediamine were admixed with 100 parts by weight of 96% denatured ethanol in a heatable reaction vessel provided with a reflux cooler, a thermometer, and a stirring device. Thereafter, 140 parts by weight of epichlorohydrin were added to the mixture at 70° C., while stirring. After all of the epichlorohydrin had been added, the mixture was refluxed for 60 minutes more, accompanied by stirring. Thereafter, the reaction product was diluted with hot water to 1100 parts by weight.

*Example VI*

A mixed fabric of 55 parts of polyester fiber and 45 parts of wool was treated in a padding machine with an aqueous solution containing 50 gm. per liter of the reaction product described below and 5 gm. per liter of sodium bicarbonate. The treated fabric was then squeeze-dried to a solution absorption of about 70% and dried at about 100° C. The treated fabric exhibited an excellent water-repellent effect.

The reaction product referred to above was obtained as follows:

270 parts of N-dodecyl-p-cyclohexylenediamine were admixed by stirring with 80 parts by weight of 96% ethanol in reaction vessel provided with a reflux cooler, a thermometer and a stirring device. Thereafter, 140 parts by weight of epichlorohydrin were added over a period of 20 minutes at 75° C. After all of the epichlorohydrin had been added, the reaction mixture was refluxed for one more hour. Finally, the mixture was diluted to 1000 parts by weight with hot water, accompanied by stirring.

While I have set forth certain specific examples and preferred embodiments of my invention, it will be understood that these are solely for the purpose of illustration and I do not intend to be limited thereby and that various changes and modifications may be made in the invention without departing from the spirit of the disclosure or the scope of the appended claims.

I claim:

1. A composition for water proofing fibrous materials which comprises an aqueous mixture of 0.1 to 10% based on said fibrous materials, a reaction product of (1) a polyamine derivative containing lipophilic radicals wherein the sum of the carbon atoms in all lipophilic radicals is at least 12 carbon atoms, said polyamine derivative being selected from the group consisting of lower alkylene and arylene polyamines the nitrogen atoms of said polyamines being trivalent, said polyamines having more than two reactive hydrogen atoms attached to nitrogen atoms in the molecule and (2) epichlorohydrin.

2. A composition for waterproofing fibrous materials which comprises an aqueous mixture of 0.1 to 10% based on said fibrous materials, a reaction product of (1) a polyamine derivative containing lipophilic radicals wherein the sum of the carbon atoms in all lipophilic radicals is at least 12 carbon atoms, said polyamine derivative being selected from the group consisting of lower alkylene and arylene polyamines the nitrogen atoms of said polyamines being trivalent, said polyamines having more than two reactive hydrogen atoms attached to nitrogen atoms in the molecule and (2) epichlorohydrin, and sufficient sodium bicarbonate to obtain a solution pH of about 6.5 to 7.

3. A composition for waterproofing fibrous materials which comprises an aqueous mixture of 0.1 to 10% based on said fibrous materials, a reaction product of (1) a polyamine derivative obtained from high molecular fatty acids, and polyamines selected from the group consisting of lower alkylene and arylene polyamines wherein the sum of the carbon atoms in the fatty acid radicals is at least 12, the nitrogen atoms of said polyamines being trivalent, said polyamine derivative having more than two reactive hydrogen atoms attached to nitrogen atoms in the molecule and (2) epichlorohydrin.

4. A composition for waterproofing fibrous materials which comprises an aqueous mixture of 0.1 to 10% based on said fibrous materials, a reaction product of (1) a polyamine derivative obtained from high molecular alkyl chlorohydrin ethers containing at least 12 carbon atoms and polyamines selected from the group consisting of lower alkylene and arylene polyamines wherein the sum of the carbon atoms in the alkyl radicals is at least 12, the nitrogen atoms of said polyamine being trivalent, said polyamine derivative having more than two reactive hydrogen atoms attached to nitrogen atoms in the molecule and (2) epichlorohydrin.

5. A composition for waterproofing fibrous materials which comprises an aqueous mixture of 0.1 to 10% based on said fibrous materials, a reaction product of (1) a polyamine derivative obtained from high molecular alkylglycidyl ethers containing at least 12 carbon atoms selected from the group consisting of lower alkylene and arylene polyamines wherein the sum of the carbon atoms in the alkyl radicals is at least 12, the nitrogen atoms of said polyamines being trivalent, said polyamine derivative containing more than two reactive hydrogen atoms attached to nitrogen atoms in the molecule and (2) epichlorohydrin.

6. A process for waterproofing fibrous materials, which comprises impregnating said material with an aqueous mixture of reaction products of (1) polyamines containing lipophilic radicals wherein the sum of the carbon atoms in all lipophilic radicals is at least 12 carbon atoms, said polyamine derivative being selected from the group consisting of lower alkylene and arylene polyamines, the nitrogen atoms of said polyamines being trivalent, said polyamines containing more than two reactive hydrogen atoms attached to nitrogen atoms in the molecule and (2) epichlorohydrin, wherein said aqueous mixture contains from about 0.1 to 10% of said product based on the weight of material to be treated, in the presence of an alkaline agent in sufficient quantity to obtain a solution pH of about 6.5 to 7, and thereafter drying the impregnated materials at elevated temperatures of from about 80 to about 120° C.

7. The process of claim 6 wherein the polyamine containing lipophilic radical is obtained by a reaction between high molecular fatty acids and polyamines selected from the group consisting of lower alkylene and arylene polyamines.

8. The process of claim 6 wherein the polyamine containing the lipophilic radical is obtained by a reaction between high molecular alkylchlorohydrin ethers and polyamines.

9. The process of claim 6 wherein the polyamin containing lipophilic radical is obtained by a reaction between high molecular alkylglycidyl ethers and polyamines selected from the group consisting of lower alkylene and arylene polyamines.

10. A process for waterproofing fibrous materials, which comprises impregnating said material with an aqueous mixture of reaction products of (1) polyamines containing lipophilic radicals wherein the sum of the carbon atoms in all lipophilic radicals is at least 12 carbon atoms, said polyamide derivative being selected from the group consisting of lower alkylene and arylene polyamines, the nitrogen atoms of said polyamines being trivalent, said polyamines containing more than two reactive hydrogen atoms attached to nitrogen atoms in the molecule, and (2) epichlorohydrin, wherein said aqueous mixture contains from about 0.1 to 10% of said product based on the weight of material to be treated, in the presence of sufficient sodium bicarbonate to obtain a solution pH of about 6.5 to 7 and thereafter drying the impregnated materials at elevated temperatures of from about 80 to about 120° C.

11. A process for waterproofing fibrous materials which comprises impregnating said material at room to slightly elevated temperatures, with an aqueous mixture of reaction products of (1) polyamines containing lipophilic radicals wherein the sum of the carbon atoms in all lipophilic radicals is at least 12 carbon atoms, said polyamine derivative being selected from the group consisting of lower alkylene and arylene polyamines, the nitrogen atoms of said polyamines being trivalent, said polyamines containing more than two reactive hydrogen atoms attached to nitrogen atoms in the molecule and (2) epichlorohydrin, wherein said aqueous mixture contains from about 0.1 to 10% of said product based on the weight of material to be treated, in the presence of an alkaline agent in sufficient quantity to obtain a solution pH of about 6.5 to 7, and thereafter drying the impregnated materials at elevated temperatures of from about 80 to about 120° C.

12. A process for waterproofing fibrous materials, which comprises impregnating said material in a padding machine with an aqueous mixture of reaction products of (1) polyamines containing lipophilic radicals wherein the sum of the carbon atoms in all lipophilic radicals is at least 12 carbon atoms, said polyamine derivative being selected from the group consisting of lower alkylene and arylene polyamines, the nitrogen atoms of said polyamines being trivalent, said polyamines containing more than two reactive hydrogen atoms attached to nitrogen atoms in the molecule, and (2) epichlorohydrin wherein said aqueous mixture contains from about 0.1 to 10% of said product based on the weight of material to be treated, in the presence of an alkaline agent in sufficient quantity to obtain a solution pH of about 6.5 to 7, and thereafter drying the impregnated materials at elevated temperatures of from about 80 to about 120° C.

13. A process for waterproofing fibrous materials, which comprises impregnating said material in an impregnating machine with an aqueous mixture of reaction products of (1) polyamines containing lipophilic radicals wherein the sum of the carbon atoms in all lipophilic radicals is at least 12 carbon atoms, said polyamine derivative being selected from the group consisting of lower alkylene and arylene polyamines, the nitrogen atoms of said polyamines being trivalent, said polyamines containing more than two reactive hydrogen atoms attached to nitrogen atoms in the molecule, and (2) epichlorohydrin, wherein said aqueous mixture contains from about 0.1 to 10% of said product based on the weight of material to be treated, in the presence of an alkaline agent in sufficient quantity to obtain a solution pH of about 6.5 to 7, and thereafter drying the impregnated materials at elevated temperatures of from about 80 to about 120° C.

14. A process for waterproofing fibrous materials, which comprises impregnating said material in an immersion bath with an aqueous mixture of reaction products of (1) polyamines containing lipophilic radicals wherein the sum of the carbon atoms in all lipophilic radicals is at least 12 carbon atoms, said polyamine derivative being selected from the group consisting of lower alkylene and arylene polyamines, the nitrogen atoms of said polyamines being trivalent, said polyamines containing more than two reactive hydrogen atoms attached to nitrogen atoms in the molecule, and (2) epichlorohydrin wherein said aqueous mixture contains from about 0.1 to 10% of said product based on the weight of material to be treated, in the presence of an alkaline agent in sufficient quantity to obtain a solution pH of about 6.5 to 7, and thereafter drying the impregnated materials at elevated temperatures of from about 80 to about 120° C.

15. A process for waterproofing fibrous materials which comprises impregnating the said material at room to elevated temperatures with an aqueous mixture of reaction products (1) polyamines containing lipophilic radicals wherein the sum of the carbon atoms in all lipophilic radicals is at least 12 carbon atoms, said polyamine derivative being selected from the group consisting of lower alkylene and arylene polyamines, the nitrogen atoms of said polyamines being trivalent, said polyamines containing more than two reactive hydrogen atoms attached to nitrogen atoms in the molecule, and (2) epichlorohydrin, wherein said aqueous mixture contains from about 0.1 to 10% of said product based on the weight of material to be treated, in the presence of sufficient sodium bicarbonate to obtain a solution pH of about 6.5 to 7, and thereafter drying the impregnated materials at elevated temperatures of from about 80 to about 120° C.

References Cited in the file of this patent
UNITED STATES PATENTS

| | | |
|---|---|---|
| 2,103,872 | Schoeller et al. | Dec. 28, 1937 |
| 2,191,982 | Doser et al. | Feb. 27, 1940 |
| 2,694,629 | Reynolds | Nov. 16, 1954 |
| 2,781,389 | Mannheimer | Feb. 12, 1957 |